Dec. 24, 1957  R. J. BARTEN ET AL  2,817,352
PRESSURE REGULATING-UNLOADING VALVE
Filed March 29, 1955  2 Sheets-Sheet 1
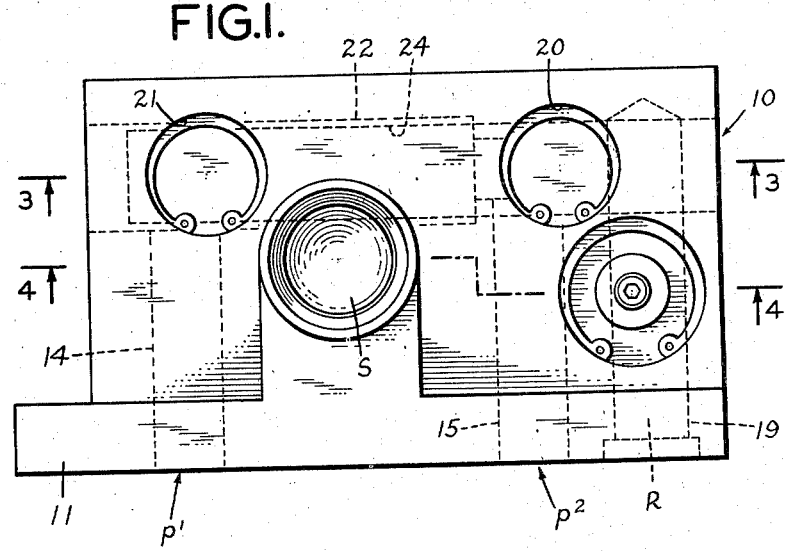
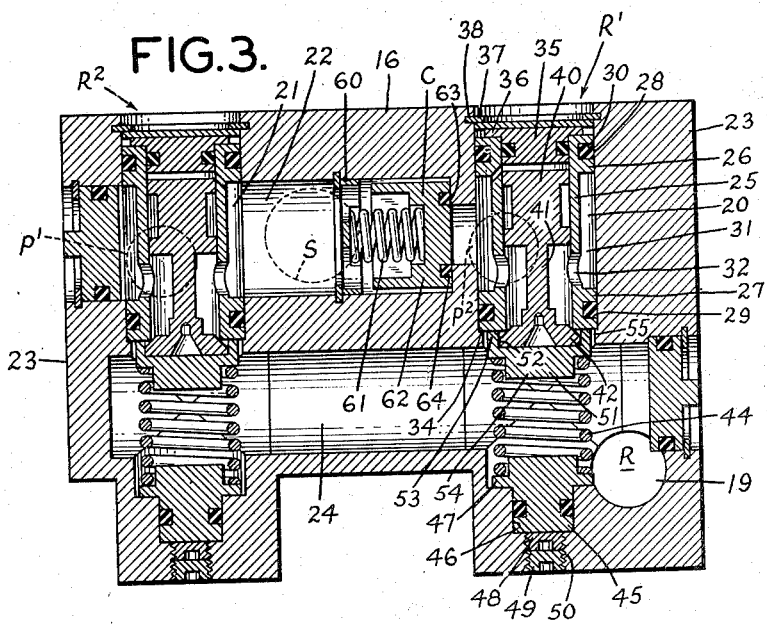
INVENTORS
HERBERT J. SWARTHOUT
RAYMOND J. BARTEN
BY
THEIR ATTORNEYS

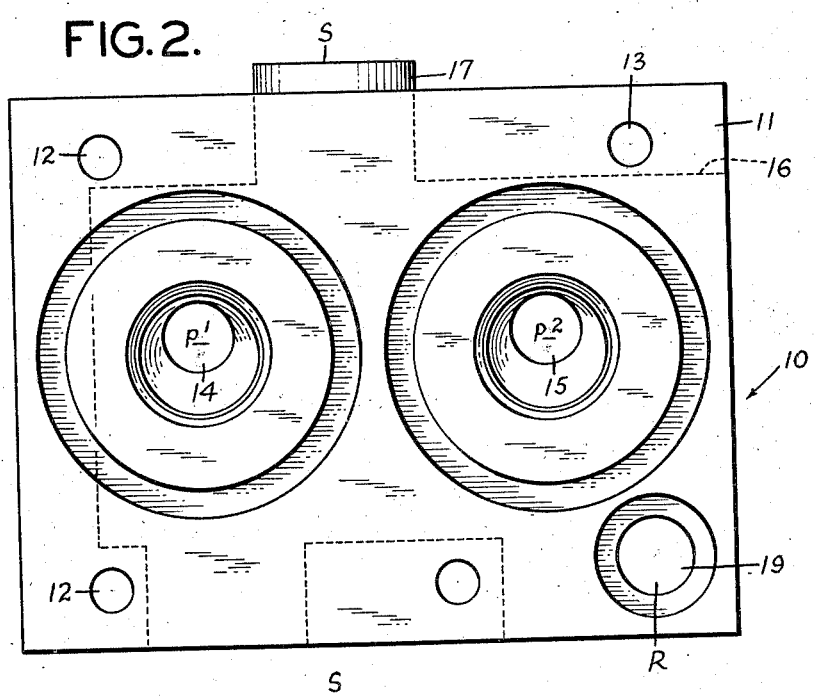
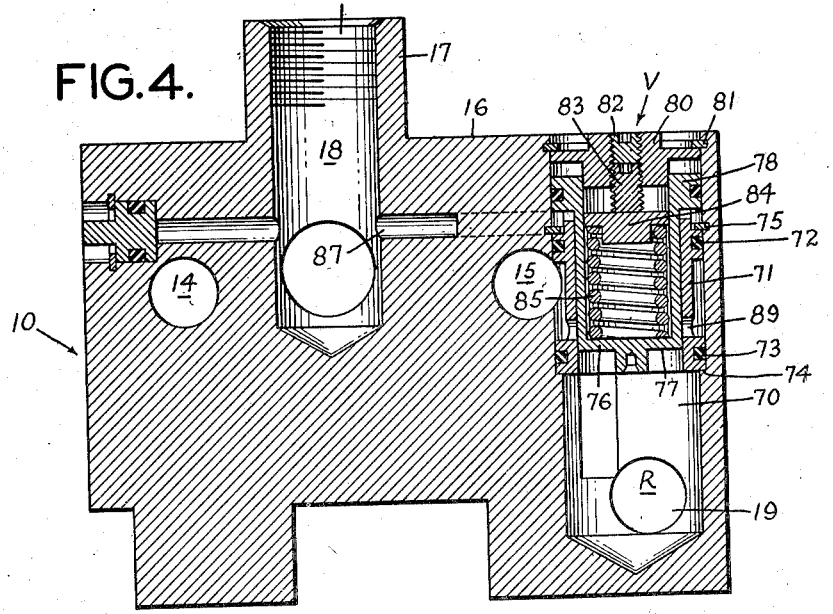

:::::: {.center}
United States Patent Office

2,817,352

Patented Dec. 24, 1957
::::::

---

2,817,352

PRESSURE REGULATING-UNLOADING VALVE

Raymond J. Barten and Herbert J. Swarthout, Kingston, N. Y., assignors to Electrol Incorporated, Kingston, N. Y., a corporation of Delaware Application March 29, 1955, Serial No. 497,520

8 Claims. (Cl. 137—108)

This invention relates to improvements in pressure regulating means for hydraulic systems and it relates particularly to an improved pressure regulating and pressure relief or unloading valve for use in a hydraulic system having dual pumps for supplying pressure to the system.

The pressure regulating and pressure relief valves used heretofore in hydraulic systems have not permitted a very close regulation of the pressure in the system nor have they been critically responsive to variation in pressure within the system. While the prior regulating valves are generally satisfactory for single pump systems not requiring close control of pressure, they have not been suitable for systems which include dual pumps for supplying the necessary pressure and volume of liquid to the system nor have they been arranged so as to produce economical utilization of the power for driving the pumps or the output of such pumps.

In accordance with the present invention, a pressure relief and pressure regulating valve unit is provided whereby the pressure in a system can be regulated within a narrow range of pressures and the valve controlled so that the load on the pumps is divided or utilized in such a manner as to achieve economical use of the power and pumps.

More particularly, the invention provides a novel type of pressure-responsive and regulating valve which maintains the system pressure within limits much narrower than was possible heretofore. Moreover, the pressure regulating means including such valves enables the load to be reduced on one of the pumps of a dual pump system at a desired pressure value so that the power consumption is substantially reduced during periods when a lower flow rate is required.

A typical pressure regulating and unloading unit includes two relief valves which are regulated to open at different pressures and a slide valve which functions as an unloader for one of the pumps and one of the valves in order to reduce the pressure against which the pump operates. While each pump normally provides half the flow required in the system, the valve unit allows unloading of one of the pumps when it operates against a high back pressure (indicating lower flow rate requirement) thereby placing a lower power demand upon it and improving the economy of the system by reducing the power consumption of the dual motors.

The relief valves utilized in the system are of unique type in that each includes a pressure responsive poppet which is provided with a head or cap cooperating with an orifice of related size to provide a fluid passage of predetermined dimensions by means of which a predetermined and controllable back pressure can be exerted on said cap. With this arrangement, the back pressure, instead of being decreased by opening of the poppet valve as is usually the case, is increased by the restriction imposed by the head or cap of the valve and the orifice in which it operates so that the valve tends to open wider permitting more rapid flow of the liquid through the open valve thereby maintaining system pressure at desired values.

For a better understanding of the present invention, reference may be had to the accompanying drawings in which:

Fig. 1 is an end elevational view of a typical valve unit embodying the present invention;

Fig. 2 is a bottom plan view of the valve;

Fig. 3 is a view in section taken on line 3—3 of Fig. 1; and

Fig. 4 is a view in section taken on line 4—4 of Fig. 1.

The valve unit described herein is used in connection with a hydraulic system for operating hydraulic motors, lifts, jacks or the like and is constructed and arranged so that two pumps driven by electric motors or the like, are used to supply the liquid pressure required in the system.

The valve chosen for purposes of illustration includes a valve casing 10 formed of aluminum, plastic or the like, and is of generally rectangular shape in top and side views. It has a base flange 11 on it provided with a series of holes 12, 13 therein for receiving bolts or the like to secure it to a supporting structure. The valve casing is provided with a plurality of bores which form the passages and ports for the valve. As shown in Figs. 1, 2 and 4, the valve casing 10 is provided with a pair of bores 14 and 15 which extend perpendicular to the base of the casing and form the pressure connections $p^1$ and $p^2$ for the two pumps for supplying fluid to the system. Extending outwardly from one side 16 of the casing is a coupling 17 which forms the system port S through which the liquid from the pumps is supplied to the hydraulic system. The system port S is a bore 18 which extends into the casing 10 from the side 16 in the manner shown in Fig. 4 of the drawing.

Near the lower right hand corner of the valve casing 10, as viewed in Fig. 2, is a port R which forms the return port of the system by means of which liquid is discharged to the reservoir (not shown) which supplies liquid to the pumps connected to the ports $p^1$ and $p^2$. The port R is formed by a bore 19 which extends upwardly through the casing 10 generally parallel with the passages 14 and 15.

The valve casing also receives two relief valves $R^1$ and $R^2$ which are used to regulate the pressure in the system and are also used to unload one or both of the pump driving motors of a part or all of the load of the system in conjunction with other structure to be described hereinafter.

As shown in Fig. 3, the two relief valves $R^1$ and $R^2$ are essentially the same in construction and are mounted in the bores 20 and 21 which extend inwardly from the side 16 of the casing generally perpendicular to the bore 18 forming the system port S. Both of the bores 20 and 21 are intersected by a transverse bore 22 which extends inwardly from the end wall 23 of the casing and intersects the system port bore 18.

The bore 20 also intersects the pressure port bore 15 and the bore 21 intersects and communicates with pump bore 14, as shown in Fig. 1. The inner ends of the bores 20 and 21 also intersect a transverse bore 24 which extends inwardly from an end of the casing 10 and at one end intersects the bore 19 forming the return port R.

Inasmuch as each of the relief valves $R^1$ and $R^2$ are essentially the same, only one of them will be described. The relief valve $R^1$ includes an elongated sleeve 25 having spaced pairs of flanges 26 and 27 near its opposite ends defining grooves 28 and 29 in which are received O-ring seals 30 for preventing leakage around the outside of the sleeve. The spaced pairs of flanges provide a space 31 communicating with the pressure port $p^2$ so that liquid from the pump is delivered around the outside of the sleeve and through the radial openings 32 in the sides of the sleeve into its interior. The sleeve is positioned in the bore 20 by means of a shoulder 34 engaging the inner end of the sleeve and by means of a closure plug 35 having a flange 36 thereon engaging the end of the sleeve and retained by means of a removable snap ring 37 which is detachably mounted in a groove 38 near the outer end of the bore. The plug 35 in conjunction with the sleeve 25 forms a piston chamber or cylinder for receiving a piston member 40 on the outer end of the valve stem 41 which carries at its lower end a conventional cone poppet head 42. A passage is formed through the upper end of the sleeve 25 to admit liquid under pressure between the plug 35 and the inner end of the piston 40 so that the valve is inherently unbalanced and is normally urged by the liquid pressure exerted on the outer end of the piston 40 towards an open position.

A spring 44 is used to bias the poppet head 42 to a closed position. This spring bears at its lower end against a plug 45 that is slidably received in a recess 46 at the inner end of the bore and is in sealing engagement with the side walls of the recess. A flange 47 on the plug 45 restricts its downward movement in the recess and also serves as a support for the lower end of the spring. The plug 45 can be adjusted axially by means of a pair of locking screw threaded plugs 48 and 49 threaded in a reduced portion 50 of the bore 18 or recess 46. The upper end of the spring bears against a head or cap member 51 which has a central recess 52 therein receiving the poppet head and a peripheral flange 53 which normally abuts against or is closely adjacent to the lower end of the sleeve 25. The cap member has a projecting portion 54 received within the spring to center the spring thereon.

A novel effect and function is obtained with the cap member 51. It will be seen that the cap member has a greater surface area than the effective area of the poppet head 42 so that when the poppet head 42 is unseated by pressure from the pump connected with the port $p^2$, the pressure will act on the valve cap 51 and will have a tendency to displace it further. More particularly, however, the cap is related to the portion 55 of the bore 20 in which it is normally disposed so as to provide an annular orifice of a predetermined area. Inasmuch as this orifice is restricted when the poppet 42 is displaced, the liquid flowing through the space between the cap 51 and the bore 55 also will be restricted so that a back pressure is built up in the system of a greater magnitude than that required to displace the poppet head initially. As a consequence, the poppet will tend to be displaced farther. This action is quite different from the normal action of a poppet valve which inherently reduces the back pressure when opened and thereby causes fluttering and lack of precise control. Inasmuch as the poppet head 42 is displaced by the higher back pressure, the cap or head 51 will likewise be displaced until an equalization of the back pressure and the displacement is achieved permitting the relatively free flow of the liquid from the pump connected to the port $p^2$ and reducing fluttering to a minimum.

It will be understood that while the relief action of the valve $R^1$ is taking place, both of the pumps are in operation and the relief $R^2$ likewise is being subjected to back pressure. However, this valve is normally adjusted so that it requires a greater back pressure to open its corresponding poppet valve than the pressure required to open the relief valve $R^1$. In these circumstances, both of the pumps may be forced to operate against a substantial back pressure, unless some means is provided for relieving one or both of the pumps of such back pressure. In this way, large amounts of energy are consumed in operating these pumps. It will be understood that the excess back pressure is due to an excess of liquid being supplied to the system and this excess of liquid therefore must be discharged through one or both of the relief valves $R^1$ or $R^2$ into the bore 24 and through the bore 19 to the return port.

In order to prevent the valve $R^2$ from being cut out of operation by the more responsive relief valve $R^1$, a check valve C is mounted in the bore 22 between the relief valves $R^1$ and $R^2$. The check valve C is of a conventional type including a retaining spider 60 which supports a spring 61 that biases a non-circular check valve plug 62 against a reduced or shouldered portion 63 forming the seat for the valve. Effective sealing is obtained by means of an O-ring 64 mounted in the face of the valve plug. Inasmuch as the valve plug is non-circular in cross-section, displacement of the plug 62 by pressure exerted at the port $p^2$ will allow the liquid to flow around the outside of the valve and to the system port S which is shown in dotted lines projected on the figure from above.

The check valve C serves to prevent flow of liquid from the pressure port $p^1$ to the pressure port $p^2$ along the passage 20 while permitting the flow from both of the ports $p^1$ and $p^2$ to the system port S.

In order to relieve one of the pumps of the need for supplying liquid to the system port when conditions of high back pressure and low liquid demand exist in the system, an unloading or relief slide valve V is also provided. As shown in Fig. 4, the valve V is mounted in a bore 70 which intersects the pressure port bore 15 and the return bore 19. Mounted within the bore 70 is a sleeve which is provided with appropriate sealing flanges 72 and 73 and which is fixed in position by means of a shoulder 74 in the bore and a snap ring 75. Mounted within the sleeve 71 is a slide valve member 76 having a closed inner end 77 and an enlarged opposite flanged end 78 in sliding engagement with the wall of the bore 70. The upper end of the sleeve valve 76 is closed by means of a closure plug 80 which is mounted in the outer end of the bore 70 and retained therein by means of a snap ring 81. The closure plug 80 carries a pair of adjusting lock screws 82 and 83 by means of which a disk 84 can be moved along the inside of the hollow sleeve valve 76 to compress the spring 85 therein and thereby vary the resistance to displacement of the sleeve valve. Also as shown in Fig. 4, a bore 87 extends transversely of the valve casing and intersects the bore 18 and communicates with the bore 70 between the upper end of the sleeve 71 and the piston flange portion 78 of the slide valve. Due to the area of the piston portion 78, an increase in pressure tends to displace the slide valve 76 bodily upward against the pressure of the spring and in so doing will uncover the radial ports 89 through the sleeve 71. This allows liquid to flow from the passage $p^2$ through the ports 89 and into the lower end of the bore 70 and thence into the return passage 19 to the return port R. An increase in the back pressure will cause a greater displacement of the slide valve 71 with the result that at a predetermined point, the back pressure in the system will be decreased to such a degree that the poppet valve of the relief valve $R^1$ can close completely with all of the liquid thereby being by-passed through the slide valve V. The spring tension will be adjusted in the slide valve V so that it opens after the pressure in the system has displaced and opened the poppet of the relief valve $R^1$. Inasmuch as the slide valve will enable the liquid to be discharged rapidly with a reduced back pressure after it has opened, the pump connected to the port $p^1$ will have its work reduced so that the power demands for driving it likewise are markedly reduced.

As indicated above, the relief valve $R^2$ is set to open when the back pressure and the flow of liquid delivered by the pump connected to pressure port $p^2$ exceeds that which can be handled by the system. When the conditions are such that the back pressure is sufficient to open the relief $R^2$ partially or fully, the motor driving the pump connected to the port $p^1$ will have been almost completely unloaded previously so that the system is supplied by the pump connected to the port $p^2$ with only so much liquid as can be handled by the system.

Due to the sensitivity of the relief valves $R^1$ and $R^2$ because of the presence of the caps and cooperating restricting orifices, opening and closing of the valves can be caused by a small variation in pressure thereby rendering the entire unit particularly sensitive and preventing overloading of the system or delay in restoring pressure to an optimum value.

It will be understood that relief poppet valves of the type described can be used also in single pump systems if desired, and that one or more pumps can be associated in a hydraulic system to control and regulate the pressure therein. Accordingly, the form of the invention described should be considered as illustrative.

We claim:

1. A pressure regulating and relief valve for hydraulic systems, comprising a casing having a pair of pressure ports, a system port to be connected to the hydraulic system and connected to said pressure ports, and a return port; a pair of normally closed relief valves in said casing interposed between said pressure ports and said return port, said relief valves being opened in response to predetermined pressures at their corresponding pressure ports, one of said relief valves being opened at a lower pressure than the other, and a normally closed pressure responsive valve in said casing and interposed between said system port and said return port, said pressure responsive valve being operable to discharge liquid from said system port to said return port at a higher pressure than the pressure required to open said one of the relief valves to by-pass liquid around the latter, the other relief valve being operable at a higher pressure than said pressure responsive valve.

2. The valve set forth in claim 1 comprising a check valve interposed between one pressure port corresponding to said one of said relief valves and said system port to enable flow of liquid from said pressure port to said system port and block reverse flow of liquid to said one pressure port from said system port and the other pressure port.

3. The valve set forth in claim 1 in which said casing includes passages between said pressure ports and said return port in which said relief valves are positioned, each relief valve comprising a poppet valve having a seat in its corresponding passage, a poppet valve head having a seat engaging portion, resilient means biasing said head toward said seat in opposition to the liquid pressure at its corresponding pressure port, an enlarged cap portion on said head outwardly of said seat engaging portion and means in said base forming a restricted annular orifice around said cap portion through which liquid flows when said valve head is displaced from said seat to provide a back pressure sufficient to keep said head displaced until the pressure in the system drops below the pressure required to displace said head intially.

4. The valve set forth in claim 1 in which said casing has a passage therein between said system port and said return port in which said pressure responsive valve is positioned, said pressure responsive valve comprising a sleeve having a radial port therein connecting said system port with said return port, and a piston-like slide valve slidable in said sleeve and normally covering said radial port, said slide valve being displaceable by pressure in said system to uncover said port and thereby divert liquid from said system port to said return port.

5. The valve set forth in claim 3 in which said casing has a passage therein between said system port and said return port in which said pressure responsive valve is positioned, said pressure responsive valve comprising a sleeve having a radial port therein connecting said system port with said return port, and a piston-like slide valve slidable in said sleeve and normally covering said radial port, said slide valve being displaceable by pressure in said system to uncover said port and thereby divert liquid from said system port to said return port.

6. A relief valve for a hydraulic system comprising a casing having a passage therein for flow of liquid therethrough under pressure, an annular valve seat member in said passage, a poppet valve head mounted for movement axially of said passage and having a seat engaging portion thereon movable into and out of sealing engagement with said seat, means biasing said valve head toward said seat, an enlargement on said valve head downstream from and of greater diameter than the seat engaging portion, said passage being of slightly greater cross section than said enlargement and forming therewith a restricted orifice of smaller area than the area of the passage between said valve and said seat when the latter is displaced from said seat, said orifice creating a back pressure in the liquid flowing through said seat to aid in maintaining said valve head out of engagement with said seat.

7. A relief valve for a hydraulic system comprising a casing having a passage therein for flow of liquid therethrough under pressure, an annular valve seat member in said passage, a poppet valve head mounted for movement axially of said passage into and out of sealing engagement with said seat, means biasing said valve head toward said seat, a disk-like cap mounted on said valve head downstream of said valve seat and rendering said head of greater diameter than the valve seat, said passage being of slightly larger cross section than said cap and forming with said cap a restricted orifice of smaller area than the area of the passage between said valve and said seat when the latter is displaced from said seat, said orifice creating a back pressure in the liquid flowing through said seat to aid in maintaining said valve head out of engagement with said seat.

8. The relief valve set forth in claim 7 in which the means biasing said valve head toward said seat comprises a spring engaging said cap and biasing said cap against said valve head.

References Cited in the file of this patent

UNITED STATES PATENTS

| | | |
|---|---|---|
| 2,395,941 | Rockwell | Mar. 6, 1946 |
| 2,507,384 | Schneck | May 9, 1950 |
| 2,654,383 | Hopkins | Oct. 6, 1953 |